United States Patent Office 3,786,122
Patented Jan. 15, 1974

3,786,122
METHOD FOR THE CONTINUOUS PRODUCTION OF A FOAMED POLYURETHANE SLAB INVOLVING FLOW FROM A VESSEL OVER A WEIR STRUCTURE
Laader Berg, Spjelkavik, Norway, assignor to Unifoam AG
Filed Aug. 24, 1971, Ser. No. 174,412
Claims priority, application Norway, Sept. 1, 1970, 3,317
Int. Cl. B29d 27/04
U.S. Cl. 264—47                                     9 Claims

ABSTRACT OF THE DISCLOSURE

Method for producing continuous polymeric foam slabs, characterized in that the liquid foam reactants are initially introduced into the bottom of a vessel and the resulting foam is allowed to expand upwardly in the vessel due to chemical reaction between the reactants. Prior to completion of the expansion of the mixture, the expanding foam is allowed to flow from the vessel over a weir structure, whereupon the foam completes the expansion process in a channel-shaped conveyor in which the foam is continuously moved away from the weir structure. According to one embodiment, the foam that flows over the weir moves down an inclined fall plate surface during completion of foam expansion. In another embodiment, the expanding foam passes over the weir directly onto the horizontal reach of a conveyor.

---

This invention relates to the continuous production of polymeric foam slabs, e.g. continuous slabs of polyurethane foam.

In such production it is common practice to deposit a mixture of liquid foam reactants onto the bottom of a continuous channel-shaped conveyor and allow the foam to rise freely due to chemical reaction until a slab of fully-expanded foam is obtained. The foam slab is then allowed to cure and, subsequently, is cross-sawn into blocks for eventual conversion into, for example, mattresses or cushions. Typically, an apparatus for such production is 50 meters long and produces a continuous foam slab having a cross-section of, say, 2 meters wide and 80 centimeters high.

The channel-shaped conveyor is usually formed from a sheet or sheets of paper arranged to constitute the bottom and two vertical sides of the channel, the bottom moving on and with a belt conveyor and the sides sliding past rigid retaining walls or being supported by moving retaining walls which move with the belt conveyor. Foam reactants are mixed in a mixing head and fed through a nozzle, the head and nozzle being reciprocated across the upstream end of the trough conveyor in a manner such that the mixture of liquid reactants is deposited evenly on the bottom of the conveyor.

Due to the substantial size of such apparatus, particularly the length, large factory premises are required. Additionally, ample head room is necessary to accommodate the reciprocating mixing head and nozzle.

Such known production method and apparatus give rise to a number of problems and disadvantages. The mechanism for reciprocating the mixing head and nozzle is inevitably complicated and expensive. As the mixture of foam reactants passes along the channel conveyor, evaporation of gases and absorption of reactants by the channel papers occur, resulting in substantial loss of reactants, particularly in the initial stages of foaming when the reactants are more liquid than solid. Furthermore, the top surface of the foam tends to take a convex shape due to friction or adhesion between the rising foam and the channel sides, so that subsequent conversion of the resultant foam blocks is less economic than with equivalent rectangular-sectioned blocks.

The considerable length necessary for such apparatus is inconvenient. The stages of production along the conveyor are (a) depositing the mixture of foam reactants on the trough conveyor, (b) allowing the reactants to foam freely until expansion ceases, (c) allowing the expanded foam to cure, during which stage the paper sheet or sheets constituting the channel are usually removed, and (d) cross-cutting the cured foam slab into blocks of required size.

The speed of the conveyor is determined by factors relating to the first and second stages. The mixture of reactants is a liquid of low viscosity which is distributed evenly across the conveyor beneath the reciprocating nozzle and it is important that this even distribution should be maintained as the liquid moves with the conveyor and starts to foam. Flow of the liquid back against the conveying direction must be avoided by choice of a sufficiently fast conveyor speed. It is also common practice to assist in avoiding such backflow by inclining the conveyor downwardly in the conveying direction. However, the speed of the conveyor must not be so fast and the conveyor inclination must not be so great as to cause the liquid to flow excessively in the conveying direction and flow under previously deposited liquid which has started to foam. (In a typical example the inclination of the conveyor would be 4.5° to the horizontal and the conveyor speed would be 5 meters per minute.) Failure to ensure that the even distribution of liquid is maintained will result in an unacceptable product which is not uniform in density, is mis-shapen, or which exhibits splits and tears in the foam structure.

Such factors dictate a certain minimum conveyor speed through the first production stage and it follows that the total length of the conveyor must travel at the same speed.

Another consideration relates to the height of the resultant foam blocks. This should be as high as possible, for a given width of block, in order to increase the proportion of usable foam to block skin (which usually must be removed). If all other parameters were equal, the height of the fully expanded foam would be dependent on the conveyor speed through the second foaming stage of production, so that the conveyor speed through this stage should be as low as possible to achieve maximum foam height. Furthermore, the curing process in the third stage proceeds as a function of time and is not affected by conveyor speed. The faster the conveyor speed, the longer must the third stage be in order that the necessary curing time shall elapse as the foam progresses through that stage. As this curing stage occupies a substantial part of the conveyor length, the result is an inconveniently long conveyor; for example 50 meters long.

Among the objects of the present invention are the provision of a method for the production of a continuous slab of polymeric foam in which the need for a reciprocating mixing head and nozzle is eliminated.

Another object is the provision of such method which enables a conveyor to be employed which is considerably shorter in length than the conveyor required in previous proposals.

A further object is the provision of such method which enables the conveyor to be run through the foaming stage at a speed slower than that required in previous proposals.

Another object of the invention is to enable such a foam slab to be produced having a substantially flat upper surface.

According to one feature of the inventoin, a method of producing a continuous slab of polymeric foam from a mixture of liquid foam reactants, in which expanded foam is formed in a continuously-moving channel-shaped conveyor, comprises the steps of continuously supplying a mixture of liquid foam reactants to the bottom of a vessel, allowing the mixture to expand upwardly in said vessel due to chemical reaction between said reactants, prior to completion of expansion of the mixture allowing partially expanded foam to flow from said vessel over a weir structure, and thereafter allowing the foam to complete the expansion process in a channel-shaped conveyor in which the foam is continuously moved away from said weir structure.

According to another feature of the invention, apparatus for carrying out the above-stated method comprises a vessel in which liquid foam reactants may expand upwardly, means for supplying liquid foam reactants to the bottom of said vessel, a weir structure associate with said vessel so that foam rising by expansion in said vessel will flow over said weir structure, and a channel-shaped conveyor associated with said weir structure and arranged continuously to convey foam away from said weir structure.

Further features and objects of the invention will become apparent from the following description of various embodiments, given by way of example only, with reference to the accompanying drawings, in which:

FIGS. 5b and 5c show elevation and plan views respectively of the modification shown in FIG. 5a;

FIG. 6b shows a plan view of the modification shown in FIG. 6a;

Figure 1:
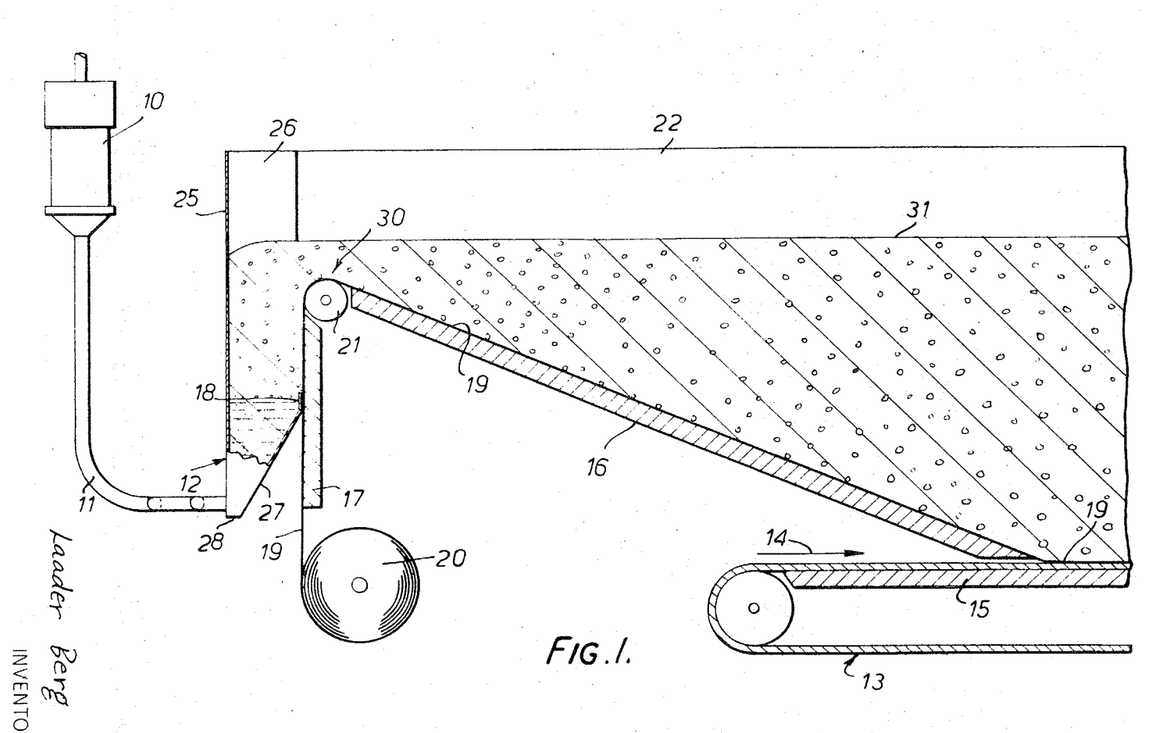
FIG. 1 is a diagrammatic vertical cross-section taken along the length of one embodiment of apparatus utilized according to the invention.
Figure 2:
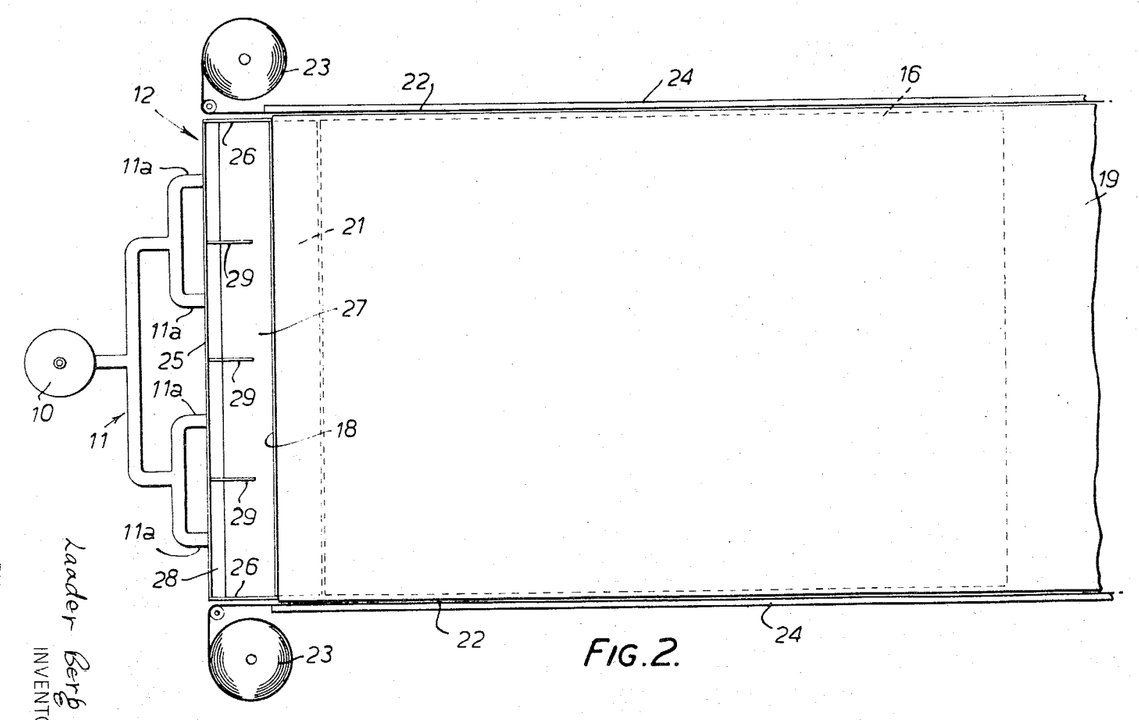
FIG. 2 is a plan view of the apparatus of FIG. 1, prior to the introduction of foam reactants.

Referring to the drawings, the embodiment of the invention shown in FIGS. 1 and 2 comprises a stationary mixing head 10, the output of which is connected by piping 11 to a vessel in the form of a trough 12. A belt conveyor 13 has its conveying reach arranged to move horizontally in the direction of arrow 14, over a stationary supporting platform 15. Between the conveyor 13 and the trough 12 are arranged an inclined fall plate 16 and an upright support member 17 having minimal spacing from a lip 18 of the trough 12. A sheet of material 19, for example kraft paper, from a supply roll 20 passes upwardly over the member 17 between said member and the trough lip 18, around a roller 21, over the inclined surface of the fall plate 16, and onto the conveying reach of the conveyor 13 to move thereafter with said conveyor.

Contiguous with each edge of the sheet 19 is a vertical side sheet 22, of material which also may be kraft paper, drawn from a respective supply roll 23, by means not shown, in the conveying direction of arrow 14 and at the same speed as the conveyor 13. The side sheets 22 are supported by respective rigid side walls 24 and constitute, with the bottom sheet 19, an open-topped channel conveyor.

The trough 12 comprises an upright rear wall 25 and side walls 26 of the same height. The front wall 27 of the trough is inclined to rise from a base 28 of the trough to the trough lip 18. The piping 11 is connected to the trough adjacent the base 28. As seen in FIG. 2, the lower part of the trough is divided into sections by baffle plates 29 and each section is fed by a branch pipe 11a from the mixing head 10, the piping arrangement being such that each trough section receives mixture from the head 10 which is the same age (i.e. has travelled the same distance) as that received by all the other sections. Instead of the arrangement of baffle plates 29, as shown, baffle plates can extend along the length of the trough (i.e. at right angles to the plates 29) the plates being spaced from each other across the trough width. Such plates can also be spaced from the bottom of the trough. Alternatively, instead of baffle plates, a perforated false floor can be provided across the trough located just above the inlets from pipes 11a.

In operation, the mixing head 10 is fed with chemical reactants suitable for producing polymeric foam, as known per se. The mixture of reactants is fed through the piping 11 to the respective sections of the trough 12. The mixture of reactants is initially liquid as it arrives in the trough but, as the liquid level rises, the mixture begins to expand and foam in manner known per se, due to chemical reaction. The expanding foam rises upwardly in the trough, passing the lip 18 and contacting the moving sheet 19. The foam continues to rise upwardly until it arrives at the region where the sheet 19 turns over the roller 21 and moves down over the fall plate 16. The roller 21 and the region of the sheet 19 overlying the roller constitute a weir structure 30 over which the foam flows, the foam being in a condition in which it is changing from a mainly liquid to a mainly solid state. As the foam expands and rises in the trough 12 so fresh liquid mixture is supplied to the bottom of the trough. Thus, a constant flow of solidifying foam passes over the weir 30 and moves down the incline of the fall plate 16. The angle of inclination of the fall plate 16 with the horizontal is chosen such that the foam, continuing to expand, retains a horizontal top surface 31. Also the arrangement is such that when the foam reaches the bottom of the fall plate, expansion or foaming has substantially ceased and the expanded foam continues horizontally along the conveyor while foam curing takes place.

By the time the expanding foam, in the trough 12, reaches the weir 30 it has acquired a sufficient viscosity that it does not seep between the edges of the sheet 19 and the side sheets 22. Furthermore, as the foam passes over the weir 30, the viscosity is such that the foam moves downwardly with the sheet 19 and exhibits negligible tendency to flow in advance of the sheet 19.

EXAMPLE

Using an apparatus as described with reference to FIGS. 1 and 2, a mixture of liquid polymeric foam reactants was produced in the mixing head 10, constituted as follows:

| | Parts by wt. |
|---|---|
| Polyether triol (polypropylene glycol) (Union Carbide Polyol L-56) | 100.00 |
| Water | 3.20 |
| Triethylene diamine (DABCO) | 0.10 |
| Silicone surfactant (Union Carbide L-540) | 1.50 |
| Stannous octoate-catalyst (T-9) | 0.20 |
| Tolylene di-isocyanate (Index 105) | 42.00 |

This mixture was fed to the trough 12, the baffles 29 preventing undue turbulence of the liquid. As the upper level of the liquid expanded upwardly, the expanding foam formed a seal over new liquid arriving in the trough, thereby reducing loss of gas evolved from the liquid reactants. Partially expanded foam was allowed to flow over the weir 30 at which stage the foam came into contact with side sheets 22. Due to the viscosity of the foam it did not seep between the bottom sheet 19 and the side sheets 22. As the expanding foam passed with the sheet 19 down over the fall plate 16, the further foam expansion was compensated by the downward gradient of the fall plate, so that the resultant foam slab was produced with a flat top surface. After expansion had ceased, the foam slab was allowed to cure as it continued along the horizontal conveyor.

The speed of the conveyor 13, and thus the sheets 19 and 22, was 3 meters per minute. The overall length of the apparatus was about 13 meters and the distance between the side sheets 22, i.e. the width of the resultant foam slab, was 2 meters. The foam slab was 1 meter high and had a substantially flat top surface, as seen in cross-section. The sides of the slab were substantially flat and, after a block had been cut from the slab and converted, the skin of the block was found to be less dense than that produced by previously proposed processes. In general, the foam block was of excellent structure and surface shape and had a substantially uniform density throughout the volume contained within the skin regions.

It was also noted that the absorption of foam reactants by the sheets 19 and 22 was much lower than experienced with previously proposed processes, due to the fact that the foam does not contact said sheets until the foam has expanded beyond the mainly liquid state.

The primary advantage of the method and apparatus of the invention is that the mixture of foam reactants is not brought into contact with the moving sheets 19 and 22 until the mixture has commenced to foam. The mixture is contained, in the wholly liquid state, in the bottom of the trough 12 and thus the problems associated with liquid flow (experienced with previous methods and apparatus) do not arise. The foam does not come into contact with the conveyed sheets until it has expanded beyond the wholly liquid state and, therefore, the conveyor and the sheets 19 and 22 can be transported at a much lower speed than hitherto without losing control of the foam. Thus, the final stages of expansion and the subsequent curing of the foam can take place on a relatively slow-moving conveyor and, therefore, in a greatly reduced conveyor length.

Figures 3, 3A, 4:
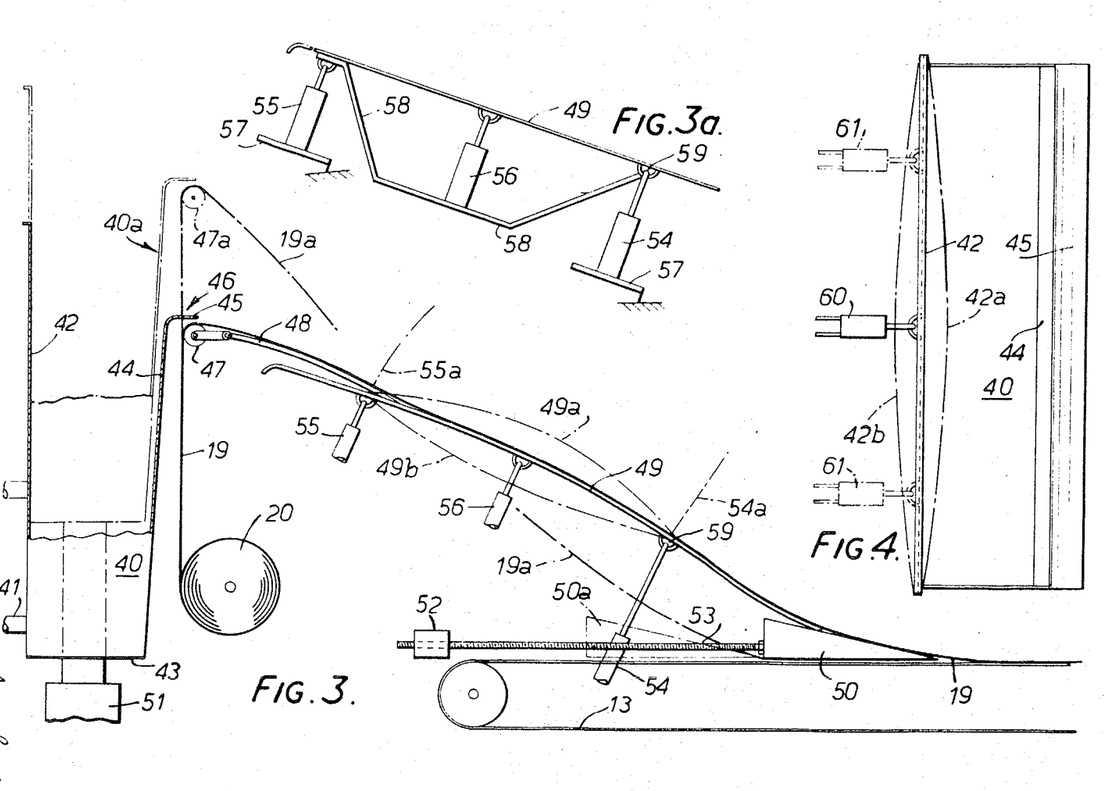
FIG. 3 is a diagrammatic representation of apparatus similar to that seen in FIG. 1 and indicating various adjustment features.
FIG. 3a is a diagrammatic representation of details of FIG. 3.
FIG. 4 is a plan view of part of the apparatus shown in FIG. 3 and incorporating further adjustment features.

In order to achieve maximum height of the resultant foam slab and also a cross-section which is as near as possible rectangular, it may be desirable to provide for ready adjustment of one or more dimensions or elements of the apparatus. Referring to FIG. 3, the apparatus diagrammatically represented is similar to that described with reference to FIGS. 1 and 2. A trough 40 can be fed with liquid foam reactants through a pipe 41 in a back plate 42. The base 43 of the trough is relatively wider than that of FIG. 1 and the front plate 44 extends upwardly to an extended lip 45 in the weir region 46. The lip 45 overlies a roller 47 for entraining the sheet 19 from the supply roll 20.

The fall plate is constituted by a number of parts comprising a curved support plate 48 mounted for pivotal movement about the axis of the roller 47. The free end of plate 48 overlies the upper end of a flexible support plate 49, the lower end of which overlies a wedge structure 50 which, in turn, overlies the conveyor 13. The sheet 19 is passed around the roller 47 and down the fall plate to the conveying reach of the conveyor 13.

The shape and attitude of the fall plate is adjustable through a wide range, by virtue of adjustment facilities provided at different parts of the apparatus. The trough 40 can be raised to a limiting position 40a by a ram 51, the roller 47 moving with the trough to a position 47a. The wedge structure 50 is movable to a retracted position 50a by a motor 52 which activates a screw drive 53. The shape and attitude of the flexible support plate 49 are adjusted by three hydraulic cylinders 54, 55 and 56, the pistons of which are attached to respective points spaced along the length of the plate. For the sake of clarity in FIG. 3, the points of attachment of the cylinders themselves are indicated in FIG. 3a. Cylinders 54 and 55 are attached to the apparatus framework 57. A link member 58 is pivotally attached at one end to the point 59 on plate 49 where the piston of cylinder 54 is attached. The piston of cylinder 55 is not attached directly to the plate 49 but via the intervening end of member 58. Cylinder 56 is attached to the member 58. Actuation of cylinder 54 positions point 59 of the plate 49 along a path indicated by the chain line 54a. Actuation of cylinder 55 positions the end of member 58, and therefore the corresponding point on plate 49, along an arcuate path (about point 59) indicated by the chain line 55a. Actuation of cylinder 56 deflects the relevant section of plate 49 between a convex contour indicated by chain line 49a and a concave contour indicated by chain line 49b.

By a suitable combination of adjustments, variations in foam behavior due to different foam formulations and changes in ambient conditions can compensated so that a satisfactory resultant product is obtained. For example, a foam formulation exhibiting a high rate of foam rise can be accepted by elevating the trough to position 40a and retracting the wedge structure to position 50a, thereby increasing the angle of the fall plate so that the bottom sheet 19 follows a path 19a.

It is intended that all the aforementioned adjustments should be continuous between the indicated limiting conditions. Furthermore, it is envisaged that only selected ones of the described adjustments will be provided in certain cases. In particular, a sufficient degree of foam control might be achieved by incorporating only the adjustable wedge 50, the fall plate being wholly constituted as an extension of the support plate 48, in order to provide a limited range of adjustment of the fall plate angle.

Figure 5A:
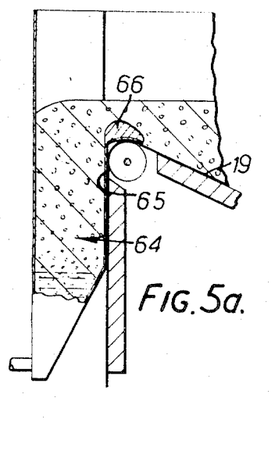
FIG. 5a shows a part of the apparatus shown in FIG. 1, including a modification.
Figure 5B:
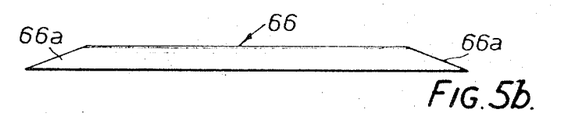
Figure 5C:
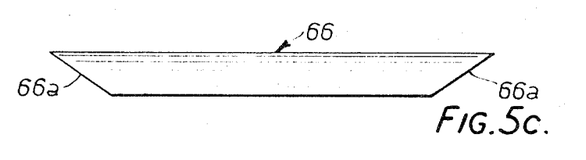

Control of the top surface shape of the expanded foam can be achieved by controlling the amount of foam flowing over the weir at different points along the weir; in particular causing more or less foam to flow at the end portions of the weir than at the central portion. In FIG. 4, the trough of FIG. 3 is seen in plan and the back plate 42 is deformable between positions 42a and 42b by an hydraulic cylinder 60. When the plate is in the position 42a more foam will flow over the ends of the weir than at the center and vice-versa when the plate is in the position 42b. If desired, additional hydraulic cylinders 61 can be employed to provide improved control of the back plate deflection.

Where the need to depart from a uniform flow over the weir can be predetermined with sufficient accuracy, a boom can be provided along the edge of the weir, as shown in FIGS. 5a to 5c. The trough 64 seen in FIG. 5a is similar to that of FIG. 1, except that the front lip is extended upwardly at 65 to the level of the weir and carries along its upper edge a boom 66, the foam having to flow over the boom to the downwardly inclined bottom sheet 19. The boom is shaped at its ends to allow more foam to flow over the ends than at the center. As seen in elevation (FIG. 5b) and in plan (FIG. 5c) the ends 66a of the boom are tapered to permit less restricted flow of foam at the ends of the boom than elsewhere along the boom.

Figure 6A:
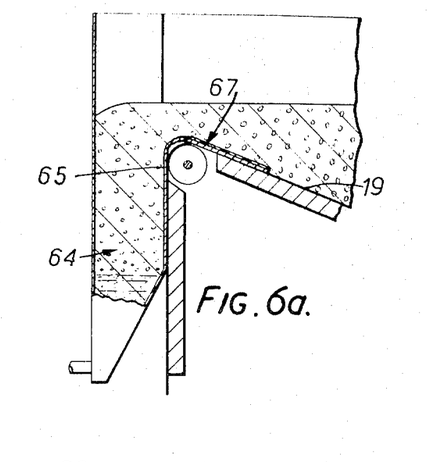
FIG. 6a is similar to FIG. 5a, but including an alternative modification.
Figure 6B:
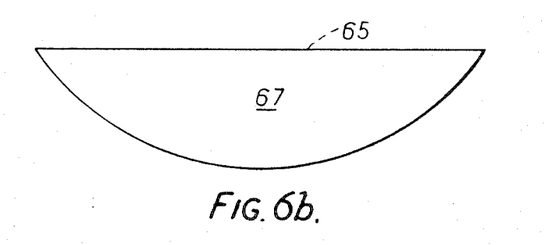

An alternative device for controlling the amount of foam flowing from different points along the weir is shown in FIGS. 6a and 6b, in which the extended front lip 65 of the trough has attached to it an apron 67 which extends downwardly over the bottom sheet 19. The shape of the apron, in plan, is seen in FIG. 6b. The apron is formed of silicone treated paper so that foam flowing over the apron experiences a frictional drag relative to the apron surface. Thus, in view of the apron shape, foam flows onto the bottom sheet 19 faster from the ends of the weir than from the central portion.

Figure 7:
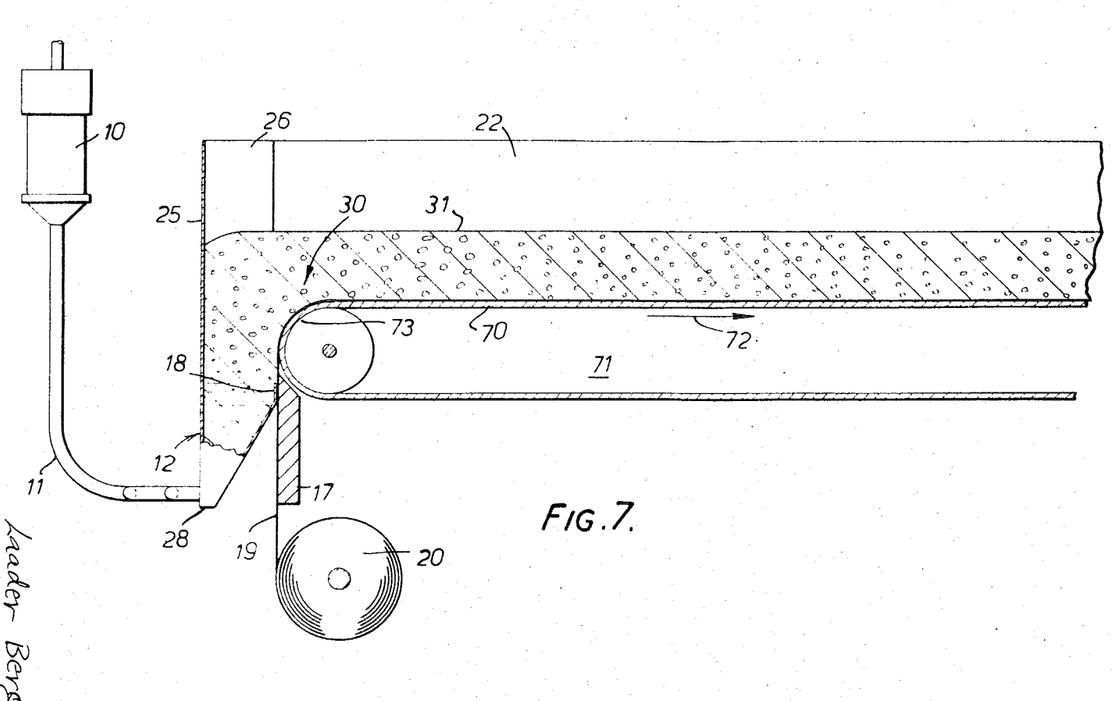
FIG. 7 is similar to FIG. 1 and shows another embodiment of apparatus utilized according to the invention.

In applications in which the expanded foam product is required to be restricted in height, say up to a maximum of about 5 cm. high, advantages of the invention can be obtained without employing a fall plate. FIG. 7 shows an apparatus similar in many respects to that shown in FIG. 1 and like parts are denoted by the same reference numerals as in FIG. 1. However, after the bottom sheet 19 is directed upwardly past the trough lip 18, the sheet passes directly onto the conveying reach 70 of a belt conveyor 71 (corresponding to the conveyor 13 of FIG. 1). The conveying reach 70 moves horizontally in the direction of the arrow 72 and the weir 30 is constituted at the upstream end 73 of the conveyor. If desired, the lip 18 of the trough can be modified so as to incorporate the flow control devices described with reference to FIGS. 5a to 5c and FIGS. 6a and 6b. Furthermore, the trough shape can be adjustable as described with reference to FIG. 4.

The embodiment of FIG. 7 has particular application to the production of foam-backed sheet material, the bottom sheet 19 then being constituted by the material to be backed. The sheet 19 might be of a textile material, possibly with that surface which will contact the foam being treated to assist adhesion of the foam to the sheet. As the sheet 19 is transported upwardly past the trough lip 18, it will contact expanding foam which is sufficiently tacky to adhere satisfactorily to the sheet but which is no longer wholly liquid so as to be absorbed excessively by the sheet material. Such excessive absorption is an acknowledged problem in previously proposed production methods.

Figure 8:
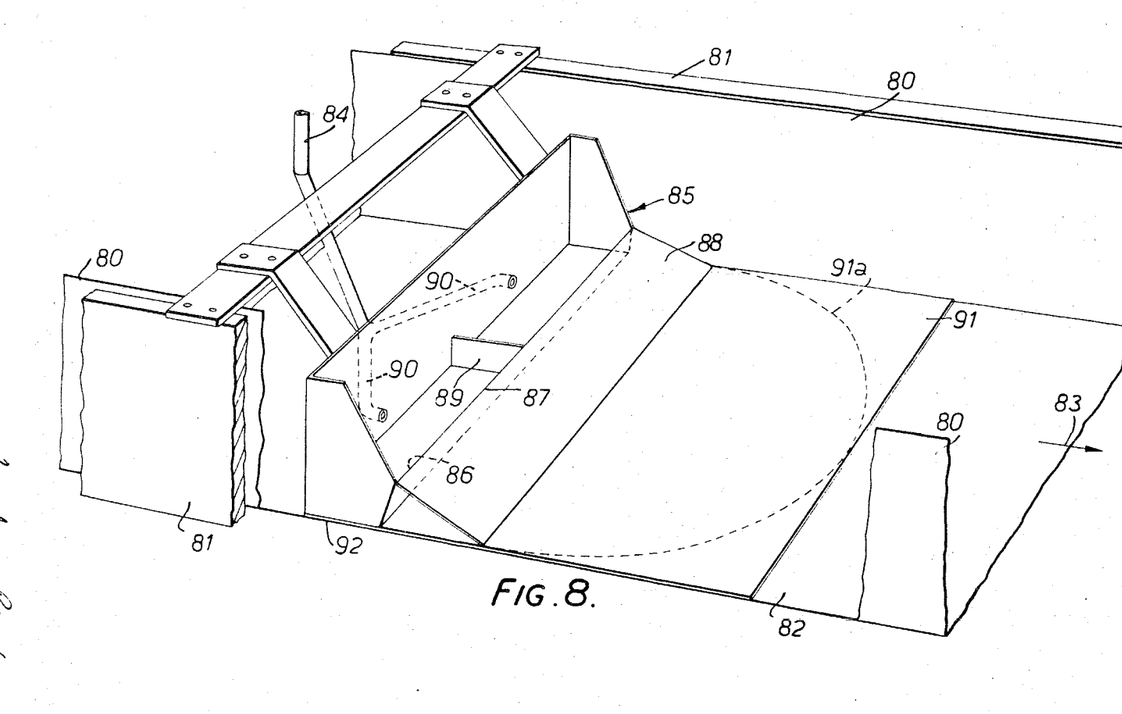
FIG. 8 is a perspective view, with parts shown broken away, of a further embodiment of apparatus according to the invention.

Some of the advantages of the present invention can be obtained using conventional apparatus for the continuous production of polymeric foam slabs, with a relatively simple modification. Referring to FIG. 8, such conventional apparatus comprises an open topped channel conveyor constituted by paper side sheets 80, supported by rigid stationary side walls 81, and a paper bottom sheet 82 supported by a conveyor belt (not shown) which transports the channel conveyor in the direction of arrow 83. A mixture of liquid foam reactants is deposited on the bottom sheet 82 through a feed nozzle (not shown) reciprocated across the conveyor at the upstream end thereof and the foam reactants expand as the conveyor moves along. Such conventional apparatus is very well known so as not to require further description.

The modification according to the present invention involves maintaining the feed nozzle stationary and connecting it to a pipe 84 leading to a trough 85 extending across the width of the channel conveyor and supported, with minimal clearance, above the bottom sheet 82. The trough may be fashioned from sheet metal and comprises a front wall 86 extending upwardly to a lip 87 leading to a downwardly inclined fall plate 88. A baffle plate 89 divides the lower part of the trough into two sections each connected to the pipe 84 through a respective branch pipe 90.

In this embodiment the trough lip 87 constitutes the weir and liquid foam reactants fed to the bottom of the trough begin to expand and rise until they flow over the weir (the lip 87) and pass down the fall plate 88 onto the bottom sheet 82 of the channel conveyor. Thus, even distribution of liquid foam reactants can be achieved without employing any reciprocating or otherwise moving nozzle. Furthermore, expanding foam is deposited on the bottom sheet 82 of the channel conveyor, rather than liquid reactants, and such foam will tend to retain its intended position on the conveyor so that the conveyor can be run at a lower speed than usual.

Due to the non-adjustable nature of the structure of the trough 85, it may be found that certain formulations of foam reactants do not achieve a sufficiently solid state before flowing onto the channel conveyor. This problem can be overcome by providing, as shown, a rectangular apron 91 attached at 92 to the base of the trough 85 and extending downstream an appropriate distance from fall plate 88. The apron overlies the bottom sheet 82 of the channel conveyor and is formed of a sheet of silicon-treated paper. Friction between the foam and the apron retards the flow of the foam to allow a greater degree of foam expansion before it reaches the bottom sheet 82 of the conveyor. If desired, the distribution of foam across the channel conveyor can be controlled by shaping the edge of the apron as indicated by the broken line 91a and as explained with reference to FIGS. 6a and 6b.

What we claim is:

1. A method for producing from a mixture of liquid polyurethane foam reactants a continuous slab of expanded polymeric foam, which comprises the steps of
    (a) continuously introducing a mixture of the liquid foam reactants into the bottom portion of a vessel;
    (b) permitting the mixture to expand upwardly in the vessel due to the chemical reaction between said reactants, so that the expanding foam forms a seal over the new liquid foam reactants supplied to said vessel, thereby reducing loss of gas evolved from the liquid reactants;
    (c) causing the foam mixture, while in a partially expanded state, to flow from said vessel over a weir structure; and
    (d) continuously moving the partially expanded foam away from said weir structure by means of a continuously travelling open-topped channel-shaped conveyor within which the foam mixture completes its vertical expansion.

2. The method recited in claim 1, wherein a plurality of portions of the liquid foam reactant mixture of the same age are introduced simultaneously into the bottom portion of the vessel at locations having the same elevation, whereby the foam expands uniformly upwardly in the vessel.

3. The method defined in claim 1, and further including the step of controlling the flow of the partially expanded foam over the weir structure by varying the distribution of the foam flowing over the weir so that sufficiently greater quantities of said partially expanded foam flow over each end portion of said weir than the center portion thereof to produce on the resultant cured foam slab a flat upper surface.

4. The method as recited in claim 1, and further including the step of conveying the partially expanded foam from the weir structure along a downwardly inclined path having an angle of inclination which causes the resultant cured foam slab to have a flat upper surface.

5. The method defined in claim 4, wherein the downwardly inclined path comprises a flexible support plate, and further including the step of varying the cross-sectional configuration of the support plate throughout its width relative to the vertical plane extending longitudinally therethrough in order to alter the flow rate over the plate and to thus maintain flat the top surface of the resultant cured foam slab.

6. The method as defined in claim 1, and further including the step of allowing the partially expanded foam to flow over a stationary surface prior to reaching the bottom of the channel-shaped conveyor, said stationary surface permitting less partially expanded foam to flow over its central portion than flows over the ends thereof whereby the resultant foam slab has a flat horizontal surface.

7. The method as claimed in claim 6, wherein the partially expanded foam is allowed to flow over the weir structure before reaching said stationary surface, said stationary surface producing a greater frictional resistance to fluid flow at the central portion of the partially expanded foam than at its ends whereby the resultant foam slab has a flat horizontal surface.

8. The method as defined in claim 1, wherein said channel-shaped conveyor includes a continuously travelling bottom sheet, and further wherein said vessel includes a lip spaced below said weir structure; and further including the step of initially conveying the bottom sheet upwardly past the vessel lip and over the weir structure together with the partially expanded foam, whereby the bottom sheet becomes part of the weir structure and thereafter constitutes the bottom of said channel-shaped conveyor.

9. The method defined in claim 8, wherein said bottom sheet is permanently bonded to the slab upon completion of curing of the partially expanded foam.

References Cited

UNITED STATES PATENTS

| | | | |
|---|---|---|---|
| 2,441,235 | 5/1948 | Blair et al. | 264—50 X |
| 3,248,464 | 4/1966 | Telkes | 264—50 X |
| 3,265,786 | 8/1966 | Voelker | 264—54 |
| 3,476,845 | 11/1969 | Buff et al. | 264—54 |
| 3,488,800 | 1/1970 | Kornylak | 264—54 UX |
| 3,123,856 | 3/1964 | Dye et al. | 264—47 |
| 3,152,361 | 10/1964 | Edwards | 264—54 |
| 3,659,981 | 5/1972 | Ferstenberg | 425—40 X |
| 3,672,348 | 6/1972 | Ferstenberg | 425—40 X |

FOREIGN PATENTS

| | | | |
|---|---|---|---|
| 466,629 | 6/1937 | Great Britain | 264—50 |
| 618,604 | 2/1949 | Great Britain | 264—50 |
| 745,121 | 10/1966 | Canada | 156—79 |
| 1,016,719 | 1/1966 | Great Britain | 156—79 |

OTHER REFERENCES

Bender, Rene J.: "Handbook of Foamed Plastics," Libertyville, Ill., Lake Publishing Corp., © 1965, pp. 23–34, 132, 174–179.

Benning, Calvin J.: "Plastic Foams: The Physics and Chemistry of Product Performance and Process Technology," vol. 1, New York, Wiley-Interscience, © 1969, pp. 131–134.

PHILIP E. ANDERSON, Primary Examiner

U.S. Cl. X.R.

264—48, 54, 171, 216, DIG. 14; 425—4 C